(12) United States Patent
Wallner et al.

(10) Patent No.: US 7,536,528 B2
(45) Date of Patent: May 19, 2009

(54) MEMORY ARRANGEMENT

(75) Inventors: Paul Wallner, Prien (DE); Chaitanya Dudha, Munich (DE)

(73) Assignee: Qimonda AG, Munich (DE)

( * ) Notice: Subject to any disclaimer, the term of this patent is extended or adjusted under 35 U.S.C. 154(b) by 256 days.

(21) Appl. No.: 11/679,609

(22) Filed: Feb. 27, 2007

(65) Prior Publication Data
US 2007/0204116 A1     Aug. 30, 2007

(30) Foreign Application Priority Data
Feb. 27, 2006 (DE) .................. 10 2006 009 027

(51) Int. Cl.
*G06F 13/00* (2006.01)
(52) U.S. Cl. ...................... 711/170; 711/118
(58) Field of Classification Search ............. 711/170, 711/118, 154; 365/233.3
See application file for complete search history.

(56) References Cited

U.S. PATENT DOCUMENTS

| 5,898,623 | A | 4/1999 | Clinton et al. |
|---|---|---|---|
| 6,501,698 | B1 * | 12/2002 | Mobley ........................ 365/221 |
| 7,308,524 | B2 * | 12/2007 | Grundy et al. ............... 711/103 |
| 7,418,526 | B2 * | 8/2008 | Jeddeloh ......................... 710/5 |
| 2004/0202027 | A1 | 10/2004 | Kuzmenka et al. |
| 2005/0097264 | A1 | 5/2005 | Park et al. |
| 2005/0180255 | A1 | 8/2005 | Tsern et al. |

OTHER PUBLICATIONS

Crisp, Richard, "High Bandwidth RDRAM Technology Reduces System Cost," IEEE Proceedings of COMPCON '96, pp. 365-377 (1996).

* cited by examiner

*Primary Examiner*—Vu A Le
(74) *Attorney, Agent, or Firm*—Dicke, Billig & Czaja, PLLC

(57) ABSTRACT

A memory arrangement includes an interface configured to transmit, code and/or decode data in the form of data packets in accordance with a predefined protocol. The memory arrangement includes at least two memory banks, each memory bank including at least one memory cell. The memory arrangement includes at least two memory-bank access devices configured to facilitate accessing the data of the at least one memory cell of each of the at least two memory banks. The memory arrangement includes at least two temporary storage devices configured to temporarily store data being transmitted between the interface and the at least two memory-bank access devices. Each of the at least two temporary storage devices is connected to the interface and to one of the at least two memory-bank access devices.

25 Claims, 4 Drawing Sheets

MEMORY ARRANGEMENT

CROSS-REFERENCE TO RELATED APPLICATIONS

This Utility Patent Application claims priority to German Patent Application No. DE 10 2006 009 027.6, filed on Feb. 27, 2006, which is incorporated herein by reference.

BACKGROUND

In many modern memory arrangements for computer systems and other electronic data processing systems, the memory arrangement is not driven via parallel application of data signals, address signals and control signals, as in typical conventional memory arrangements, but rather via data packets that are transmitted at high speed and at high frequency, in accordance with a predefined protocol, between, for example, a computer system and an interface of the memory arrangement. These data packets may contain write data, read data, addressing data, and command data.

Data packets that, for example, are sent from a computer system to the memory arrangement, are received and decoded by the interface of the memory arrangement. In accordance with the predefined protocol, the received data are interpreted and processed as commands, address data, or write data. In comparable manner, read data can also be coded into data packets by the interface and transmitted to, for example, a computer system.

The memory arrangement of such a type comprises several memory banks that can be accessed via several memory-bank access devices and that each include a plurality of memory cells.

SUMMARY

One embodiment provides a memory arrangement including an interface configured to transmit, code and/or decode data in the form of data packets in accordance with a predefined protocol. The memory arrangement includes at least two memory banks, each memory bank including at least one memory cell. The memory arrangement includes at least two memory-bank access devices configured to facilitate accessing the data of the at least one memory cell of each of the at least two memory banks. The memory arrangement includes at least two temporary storage devices configured to temporarily store data being transmitted between the interface and the at least two memory-bank access devices. Each of the at least two temporary storage devices is connected to the interface and to one of the at least two memory-bank access devices.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 3:
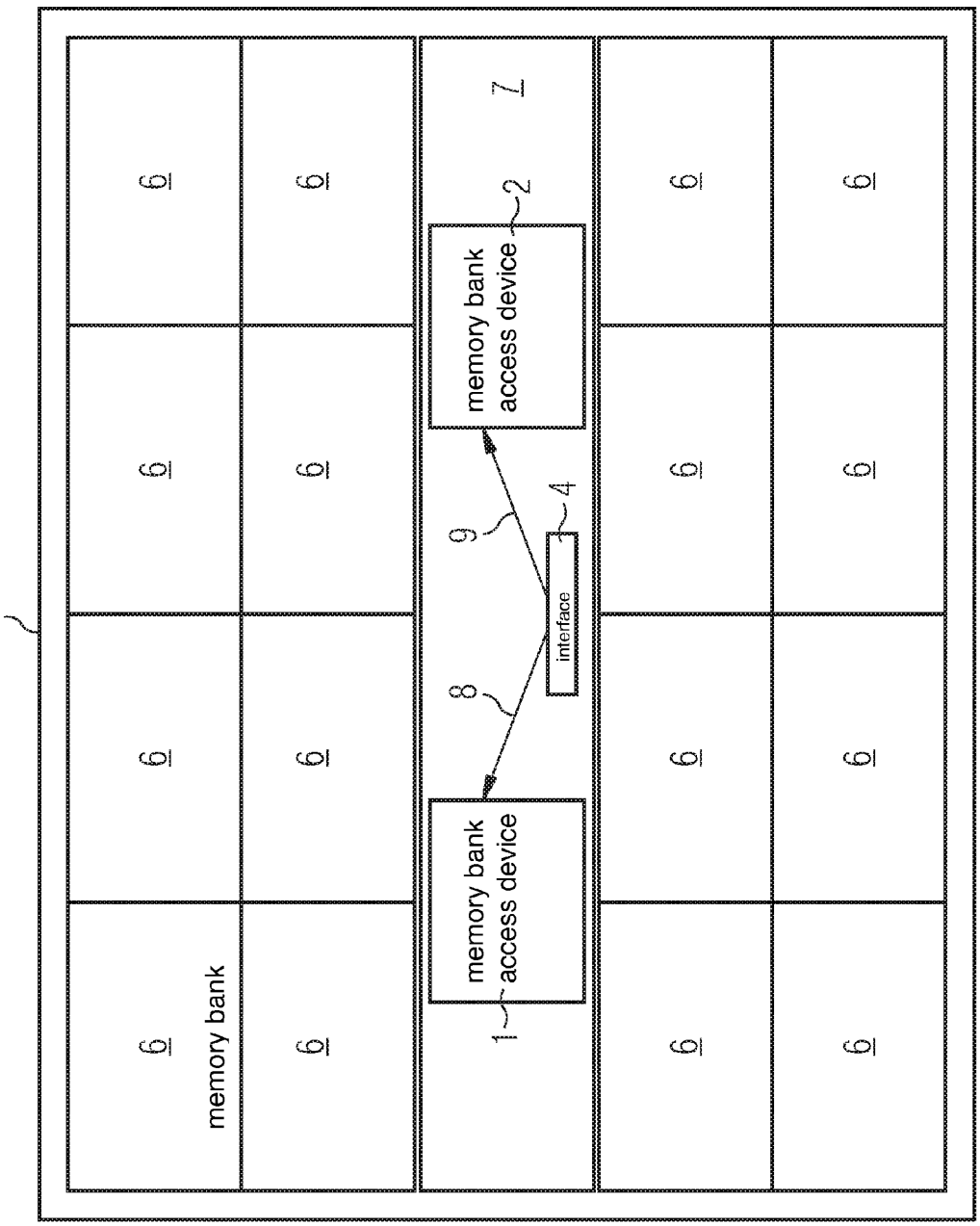
FIG. 3 is a schematic top view of a memory arrangement in which a data flow is represented.

FIG. 3 illustrates an example memory arrangement 10 with sixteen memory banks 6 which are arranged in a four-by-four matrix. In the top view of the memory arrangement 10 illustrated in FIG. 3, the upper eight memory banks 6 are spaced from the lower eight memory banks 6, so that a strip-shaped area 7, which is also referred to as spine, is formed between the upper eight memory banks 6 and the lower eight memory banks 6. For example, in the case of an arrangement with a first memory-bank access device 1 and a second memory-bank access device 2, the sixteen memory banks 6 are further partitioned into two groups, each of eight memory banks 6, in which, referring to FIG. 3, a left group defines the eight memory banks 6 located on the left in a top view, and a right group defines the eight memory banks 6 located on the right in the top view. A memory bank 6 pertaining to the left group is accessed via the first memory-bank access device 1, and a memory bank 6 pertaining to the right group is accessed via the second memory-bank access device 2. The interface 4, the memory-bank access devices 1 and 2, and further devices of the memory arrangement, such as, for example, a clock-pulse supply, are arranged in the spine 7. The interface 4 is arranged substantially at a center in the longitudinal direction of the spine 7, the first memory-bank access device 1, which is assigned to the left group of memory banks, is substantially arranged at a center in a left half of the spine 7, and the second memory-bank access device 2, which is assigned to the right group of memory banks, is substantially arranged at a center in a right half of the spine 7. Write data received by the interface 4 are transmitted in the direction of arrows 8 and 9 to the corresponding memory-bank access devices 1 and 2, respectively. Analogously, read data are transmitted contrary to the arrow directions of the arrows 8 and 9 from the memory-bank access devices 1 and 2, respectively, to the interface 4. An arrangement of such a type enables a uniform timing response of the individual memory banks to be obtained.

With a different number of memory banks and/or memory-bank access devices, appropriately optimised arrangements can be chosen.

In order to keep the costs of the memory arrangement as low as possible, it is desirable to keep the chip area as small as possible. For the spine, this means that its width, (i.e., the spacing between the upper memory banks and the lower memory banks) should be as small as possible.

In order to achieve a high system performance of the memory arrangement, temporary storage devices are inserted between the interface and the memory-bank access devices. In the course of writing, these temporary storage devices cause the write data that are decoded from a data packet to be firstly stored by the interface in the temporary storage device, in order then to be stored in the memory banks in temporally independent manner via the memory-bank access devices. Thus, for example, write data can be transmitted to the memory arrangement at a speed that is far higher than the maximum possible speed of storage of these write data in the memory banks. After the write data have been stored by the interface in the temporary storage device, the interface is ready for receiving new write data, read data, addressing data, or command data. Similarly, a command for making read data available can be received by the interface, and the read operation can be triggered, so that the interface is then ready for receiving further write data, read data, addressing data, or command data, while the read data from the memory banks are sent to the temporary storage devices via the memory-bank access devices, in order to be read out from there at a later time via the interface. A further advantage of the temporary storage is the on-chip timing response can be decoupled from the off-chip timing response.

Figure 4:
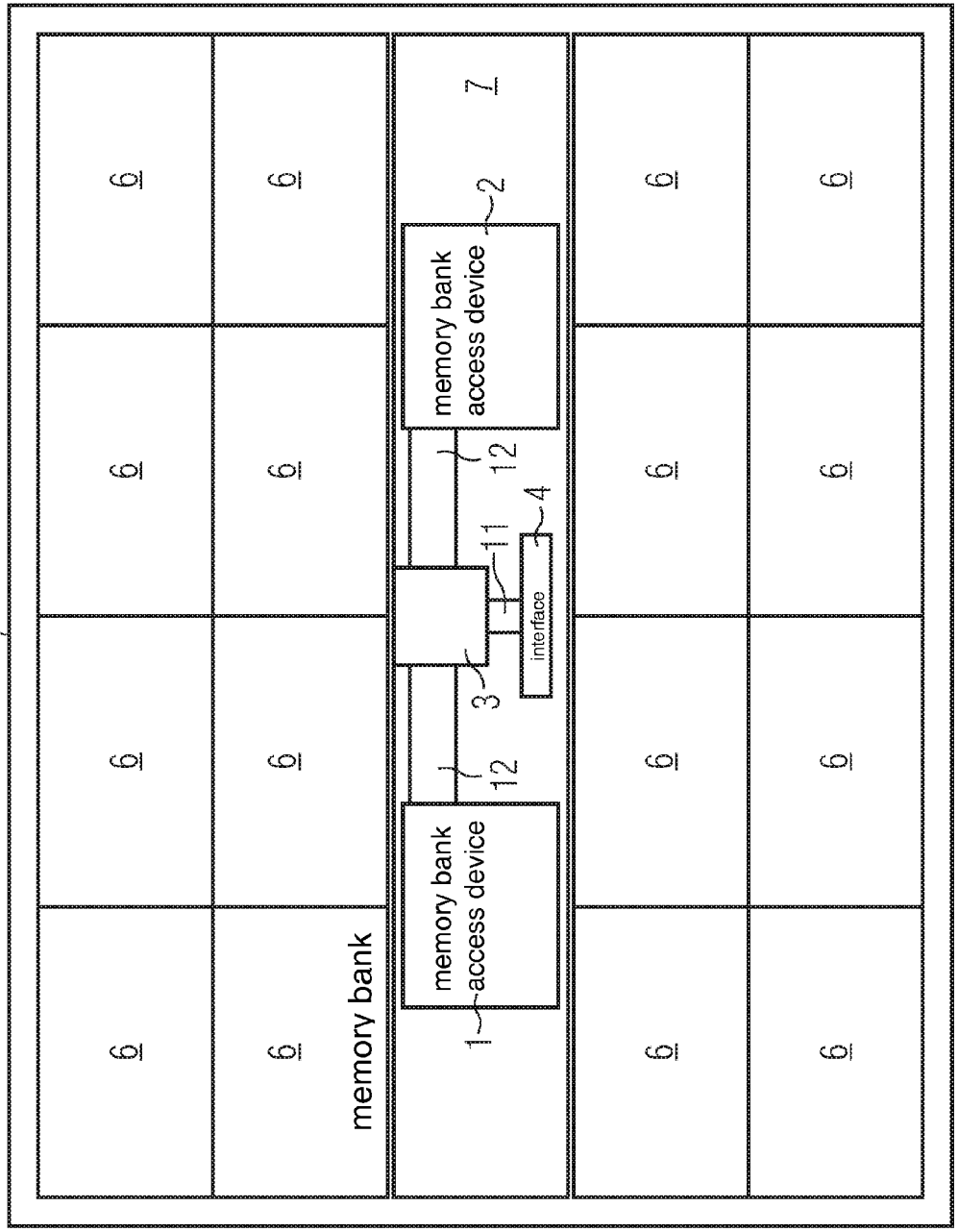
FIG. 4 is a schematic top view of a memory arrangement with only one temporary storage device.

FIG. 4 illustrates an example memory arrangement 10 with a temporary storage device 3 which is suitable to temporarily store data from data packets that are received by the interface 4. To this end, the interface 4 is connected to the temporary storage device 3 via connecting lines in an area 11, and the temporary storage device 3 is in turn connected to the memory-bank access devices 1 and 2 via connecting lines in areas 12. A symmetrical arrangement of both the temporary storage device 3 and the interface 4 is employed for reasons concerning the timing. FIG. 4 illustrates that a central arrangement of the temporary storage device 3 in the center of the spine 7 has the consequence that, on the one hand, a large chip area is employed in the center of the spine 7, which as a result is no longer available to other central functions of the memory arrangement, and that, on the other hand, relatively large areas 12 employed within the spine 7 for the connecting lines from the temporary storage device 3 to the memory-bank access devices 1 and 2. Located in the areas 12 are, for example, 72 lines in each instance, which correspond to 64 lines for 64 data bits of the data-bank memory width plus eight lines for eight masking bits.

A further advantage of the use of the temporary storage device is that, for example, the temporary storage device temporarily stores the contents of several related packets of write data, and these contents are then stored in the memory banks in one write access via the memory-bank access devices. If, for example, 64 bits can be written simultaneously via a memory-bank access device, and two memory-bank access devices are present, it is possible to transmit, firstly, 128 data bits and additional 16 masking bits which can each be used for the purpose of masking eight of the 128 data bits in each instance in, for example, four data packets, and then to transmit these 128 data bits and 16 masking bits in one write operation to the memory-bank access devices which then store the unmasked bits of the 128 data bits in the memory banks. As a result, the system performance is further enhanced.

On the other hand, it is therefore necessary to have many parallel lines between the temporary storage device and the memory-bank access devices in the above example, 72 lines to each memory-bank access device. Since these lines are also located in the spine, this employs a large surface area within the spine, and consequently a large width of the spine.

One embodiment of a memory arrangement comprises an interface, which is suitable for transmitting, coding and/or decoding data in the form of data packets in accordance with a predefined protocol, at least two memory banks, which each include at least one memory cell, at least two memory-bank access devices, via which the data of the memory cells of the at least two memory banks are accessed, and at least two temporary storage devices, the temporary storage devices being suitable for temporarily storing data that are being transmitted between the interface and the at least two memory-bank access devices, and each of the at least two temporary storage devices being connected both to the interface and to one of the at least two memory-bank access devices.

According to one embodiment, the memory arrangement includes an even number of memory banks, a first memory-bank access device and a second memory-bank access device. The memory cells pertaining to a first half of the memory banks are accessed via the first memory-bank access device, and the memory cells pertaining to a second half of the memory banks are accessed via the second memory-bank access device.

According to one embodiment, two temporary storage devices and two memory-bank access devices can be arranged on the memory arrangement, one of the two temporary storage devices being arranged in each instance adjacent to one of the two memory-bank access devices. In each of the two temporary storage devices only that portion of the data is temporarily stored which is being transmitted via the adjacently arranged memory-bank access device. Hence the chip area of each individual temporary storage device that is employed amounts approximately to one half of the chip area of a comparable unpartitioned temporary storage device.

According to one embodiment, two memory-bank access devices and four temporary storage devices are provided on the memory arrangement, two of the four temporary storage devices being arranged in each instance adjacent to each of the two memory-bank access devices. In each of the four temporary storage devices only that portion of the data is temporarily stored in each instance which is being transmitted via the adjacently arranged memory-bank access devices, so that the chip area of each of the four temporary storage devices corresponds approximately to one quarter of a comparable unpartitioned temporary storage device.

According to one embodiment, the interface of the memory arrangement is configured in such a manner that the interface is able to transmit code and/or decode write data, read data, addressing data, and command data in the form of data packets. The data packets may be structured in such a manner that a data packet includes a defined number of bits which are transmitted via several parallel lines. The number of parallel lines may be distinctly less than the number of bits of a data packet, by several consecutive bit groups being transmitted via the parallel lines and then being assembled into a data packet. Data packets with a length of, for example, 54 bits can consequently, for example, be transmitted via six lines in nine consecutive 6 bit groups. If data are being transmitted, for example, from a computer system to the memory arrangement, the interface synchronizes to the serial data stream and parallelizes the serially received data. Data that are being transmitted from the memory arrangement to, for example, a computer system are serialized by the interface.

According to one embodiment, the memory arrangement includes several memory banks that can be accessed via several memory-bank access devices. In this case, for each of the memory-bank access devices it holds that memory cells of one or more memory banks can be accessed via a memory-bank access device. Access to memory cells of a defined memory bank, on the other hand, is possible only from exactly one memory-bank access device. Consequently several memory banks can be assigned to one memory-bank access device, but one memory bank cannot be assigned to various memory-bank access devices.

According to one embodiment, the memory arrangement is employed in dynamic random access memory (DRAM) memory modules on a common chip. Of course, the invention is not restricted to this memory application but can also be employed in read only memory (ROM) memory modules or other suitable memory modules.

According to one embodiment, the memory arrangement is employed in a computer system as read/write memory or DRAM memory.

Hereinafter, embodiments are described in more detail with reference to the drawings. The description relates firstly only to the receiving and decoding of data packets and consequently to the receiving and processing of write data, addressing data, and command data. The processing of read data is effected in analogous manner and will be described briefly at the end of the description.

Figure 1:
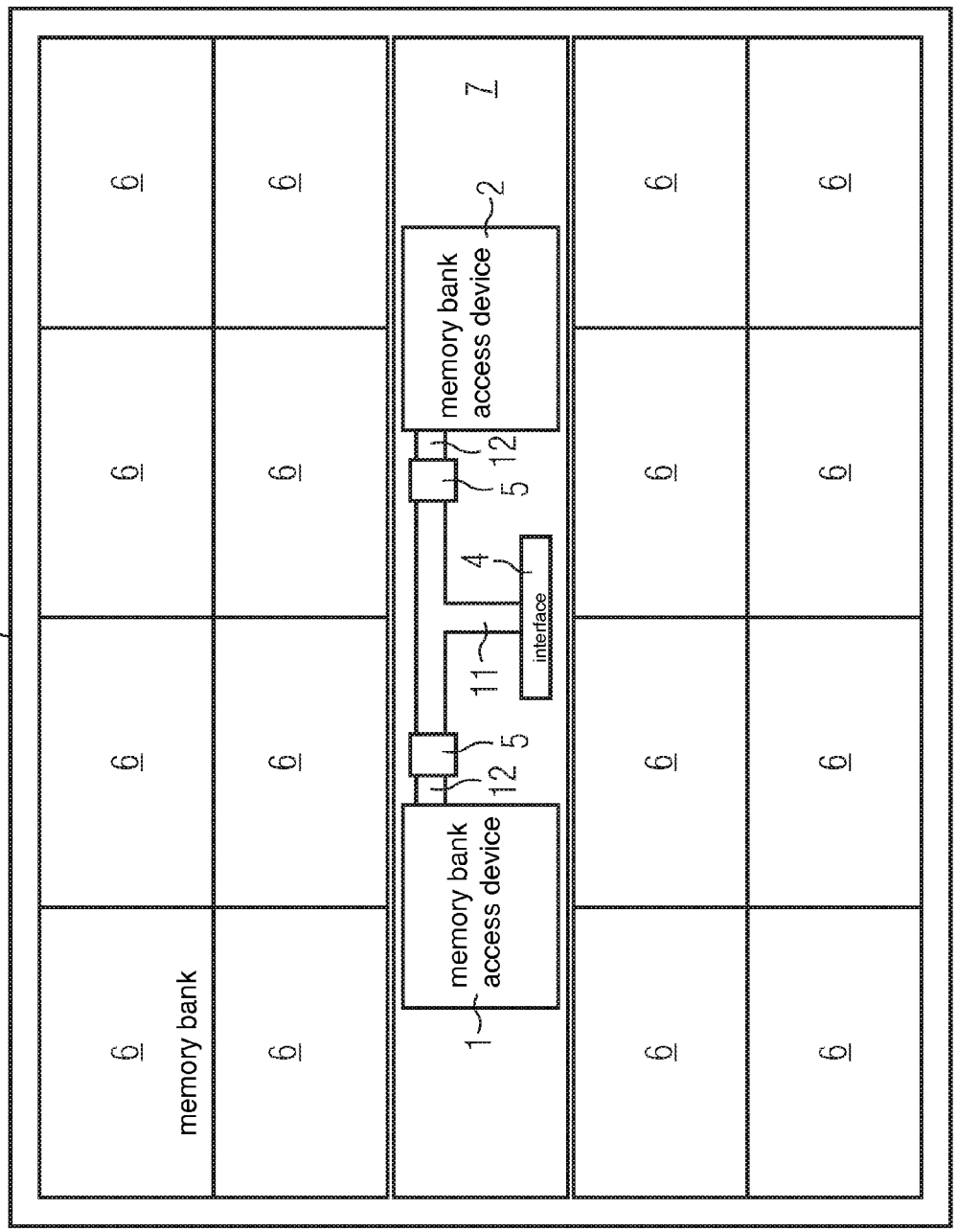
FIG. 1 is a schematic top view of a memory arrangement according to one embodiment with two temporary storage devices.

FIG. 1 illustrates schematically an embodiment of a memory arrangement 10 with an even number of memory banks 6, a first memory-bank access device 1, and a second memory-bank access device 2. The sixteen memory banks 6 are partitioned into two areas. Like in FIG. 3, eight memory banks 6 are located in an upper area, and eight memory banks 6 are located in a lower area. Located between the upper area and the lower area is a narrow, strip-shaped area 7 in which the memory-bank access devices 1 and 2 and an interface 4 are located. This narrow area 7 between each of the eight memory banks is designated as the spine 7. The sixteen memory banks 6 are further partitioned into two groups of, in each instance, eight memory banks 6, in which, referring to FIG. 1, a left group defines the eight memory banks located on the left in a top view, and a right group defines the eight memory banks located on the right in the top view. One of the memory banks 6 pertaining to the left group is accessed via the first memory-bank access device 1, and one of the memory banks 6 pertaining to the right group is accessed via the second memory-bank access device 2. The interface 4 is arranged substantially at a center in a longitudinal direction of the spine 7; the first memory-bank access device 1, which is assigned to the left group of memory banks, is arranged substantially at a center of a left half of the spine 7; and the second memory-bank access device 2, which is assigned to the right group of memory banks, is arranged substantially at a center of a right half of the spine 7.

Instead of one temporary storage device 3 as illustrated in FIG. 4, which is arranged centrally therein in the spine 7, in the embodiment illustrated in FIG. 1 a first temporary storage device 5 and a second temporary storage device 5 are arranged respectively adjacent to one of the memory-bank access devices 1 and 2, respectively, the first temporary storage device 5 being arranged in an area that extends from the center of the spine in the direction of the first memory-bank access device 1, and the second temporary storage device 5 being arranged in an area that extends from the center of the spine in the direction of the second memory-bank access device 2. In one embodiment, the temporary storage devices 5 are arranged in the aforementioned areas in such a manner that they each have a spacing from the respectively adjacently arranged memory-bank access devices 1 and 2 that is as small as possible. The two temporary storage devices 5 are connected to the interface 4 via connecting lines that are arranged in an area 11. The two memory-bank access devices 1 and 2 are each connected to one of the two temporary storage devices 5 via connecting lines that are arranged in areas 12.

The area requirement of each temporary storage device 5 corresponds substantially to one half of the area requirement of the unpartitioned temporary storage device 3 of FIG. 4, since in each temporary storage device 5 only those data are stored which are to be stored in the memory banks 6 via the memory-bank access device 1 or 2 to which the respective temporary storage device 5 is connected. Since the write data are received by the interface 4 in several data packets, after they have been decoded by the interface 4 the write data are transmitted packet-by-packet from the interface 4 to the temporary storage devices 5. As a result of this partly serialized transmission between the interface 4 and the temporary storage device 5, the number of necessary connecting lines in the area 11 between the interface 4 and the temporary storage devices 5 is reduced. In an embodiment, in each portion of the area 11 approximately 30 connecting lines are arranged, wherein the portions of area 11 extend from the center of the spine in the direction of the memory-bank access devices 1 and 2, respectively. In the memory arrangement embodiment illustrated in FIG. 4, on the other hand, in each area 12 72 lines are arranged, wherein the areas 12 likewise extend from the center of the spine in the direction of the memory-bank access devices 1 and 2, respectively. As a result of the partitioning of the temporary storage devices 5 and as a result of the arrangement of the temporary storage devices 5 adjacent to the memory-bank access devices 1 and 2, only very short areas 12 are employed, in which 72 lines run, as FIG. 1 illustrates.

As a result of this partitioned arrangement of the temporary storage devices 5, considerably less chip area is employed in the middle of the spine 7. Furthermore, as a result of the diminished number of connecting lines in the area 11 less chip area is employed in the spine 7. In addition, as a result of the symmetrical arrangement of the temporary storage devices with respect to the memory-bank access devices a uniform timing drive of the individual memory banks is obtained in one embodiment. Even if, instead of an aforementioned partitioning of the temporary storage device, only a doubling of the temporary storage device is possible, for reasons concerned with control engineering, for example, by virtue of the saving of area in the case of the connecting lines and by virtue of the arrangement of the temporary storage devices outside the central area of the spine a possible reduction in the width of the spine is achieved.

Figure 2:
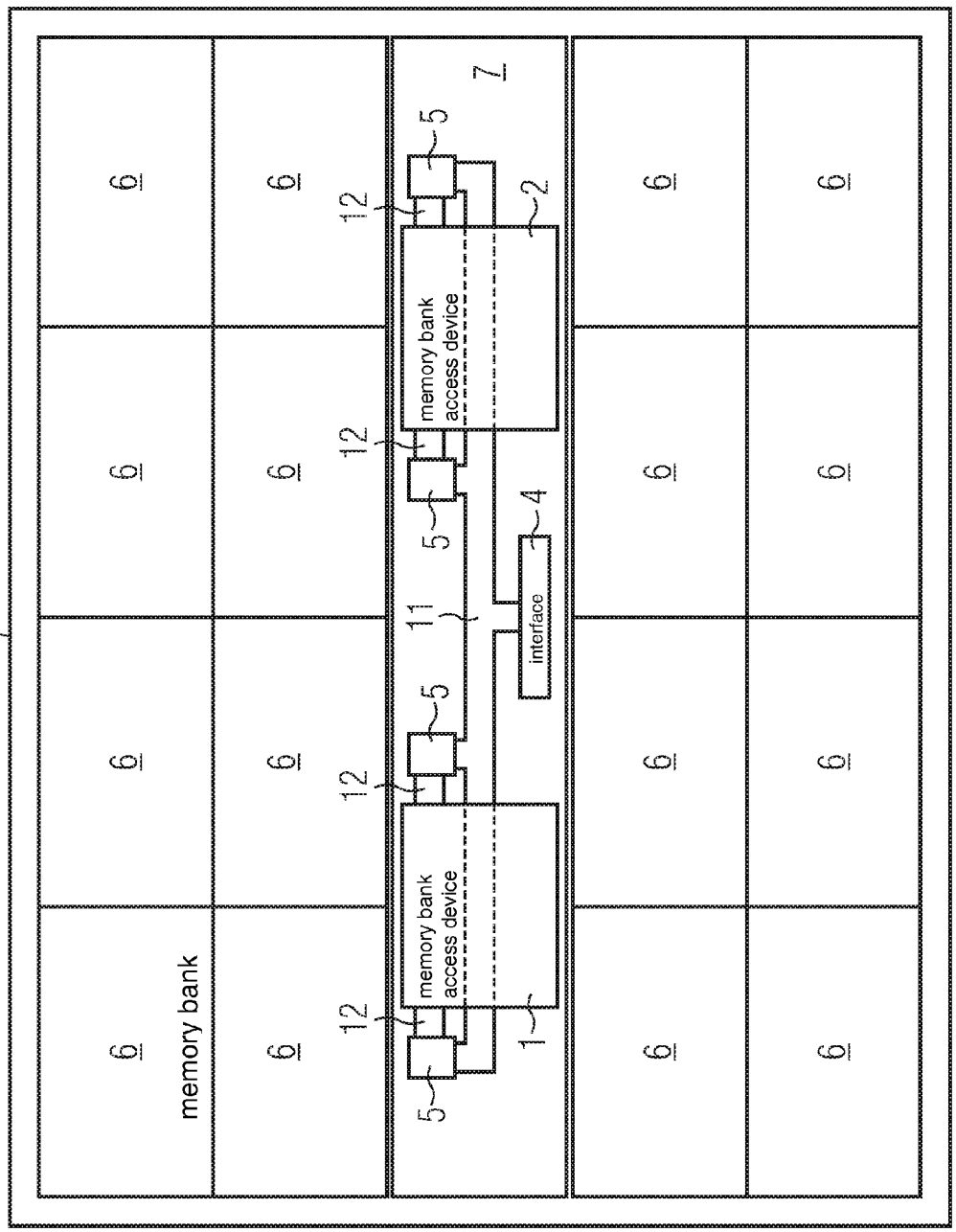
FIG. 2 illustrates a schematic top view of one embodiment of the memory arrangement with four temporary storage devices.

FIG. 2 illustrates a schematic top view of an embodiment of a memory arrangement 10. The interface 4, the memory banks 6, the spine 7 and the memory-bank access devices 1, 2 are arranged similar to as described above in the description of FIG. 1. In this embodiment, four temporary storage devices 5 are arranged at four places in the memory arrangement 10, specifically in such a manner that two temporary storage devices 5 are arranged adjacent to each memory-bank access device 1 and 2, as illustrated in FIG. 2, a first of the temporary storage devices 5 being arranged to the left of the first memory-bank access device 1, a second of the temporary storage devices 5 being arranged between the center of the spine 7 and the first memory-bank access device 1, a third of the temporary storage devices 5 being arranged between the center of the spine 7 and the second memory-bank access device 2, and a fourth of the temporary storage devices 5 being arranged to the right of the second memory-bank access device 2.

The chip area employed for each of the four temporary storage devices 5 corresponds, in each instance, to approximately one quarter of the surface area of the unpartitioned temporary storage device 3 illustrated in FIG. 4, because in each of the four temporary storage devices 5 only that portion of the data is stored which is to be stored in the memory banks 6 via the memory-bank access device 1 or 2 to which the respective temporary storage devices 5 are connected. In turn, approximately 30 connecting lines are located in the area 11 between the interface 4 and the temporary storage devices 5. In the areas 12, on the other hand, only 36 connecting lines are now arranged between, in each instance, a temporary storage device and a memory-bank access device.

As a result of this further partitioning of the temporary storage devices 5, some of the chip area employed for the temporary storage devices 5 is placed in an area of the spine 7 that is not located between the two memory-bank access devices 1 and 2. By reason of its decentralised position, this area is, in any case, capable of being utilised only for a few devices of the spine, and is consequently not decisive for the width of the spine. Consequently, as a result of this partitioning the width of the spine 7 employed by the temporary storage devices 5 can be reduced further. A further advantage of this arrangement embodiment of the temporary storage devices 5 is that the memory-bank access devices 1 and 2 are now supplied symmetrically from both sides by the temporary storage devices 5, as a result of which the timing response of the memory arrangement is simplified.

The temporary storage devices embodiments described above may be employed advantageously in conjunction with the partitioning, according embodiments, of the temporary storage devices also in the case of the readout of data from the memory banks 6. Thus, for example, temporary storage devices 5 that are arranged between memory-bank access devices 1 and 2 and an interface 4, which is configured for transmitting, coding and decoding read data, addressing data and command data, have read data written to them from the memory banks 6 via the memory-bank access devices 1 and 2 by reason of a read request. After that, a readout of the temporary storage devices 5 is possible in temporally independent manner via data packets that are coded and transmitted by the interface 4.

Furthermore, according to an embodiment, temporary storage devices temporarily store commands and command sequences that are executed in a manner temporally independent of the receiving of the commands or command sequences, in order, for example, to refresh memory banks or to provide read data.

As described above, the embodiments described above with reference to the figures may be each realized in a dedicated chip or any combination of the embodiments described above may be realized within one chip combining the functionality and characteristics of these embodiments. It is also understood that all the embodiments described above are considered to be comprised by the present invention as it is defined by the appended claims.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A memory arrangement comprising:
    an interface configured to transmit, code and/or decode data in the form of data packets in accordance with a predefined protocol;
    at least two memory banks, each memory bank including at least one memory cell;
    at least two memory-bank access devices configured to facilitate accessing the data of the at least one memory cell of each of the at least two memory banks; and
    at least two temporary storage devices configured to temporarily store data being transmitted between the interface and the at least two memory-bank access devices, wherein each of the at least two temporary storage devices is connected to the interface and to one of the at least two memory-bank access devices.

2. The memory arrangement according to claim 1, wherein the interface is configured to transmit serialized data packets, wherein the interface comprises:
    a device configured to parallelize and synchronize received data packets; and
    a device configured to serialize data packets to be sent.

3. The memory arrangement according to claim 1, wherein the interface is configured to transmit, code and/or decode write data, read data, addressing data, and command data.

4. The memory arrangement according to claim 1, wherein the memory arrangement is configured such that for each memory cell of the at least two memory banks, a defined memory cell is accessed only via precisely one of the at least two memory-bank access devices.

5. The memory arrangement according to claim 1, wherein the memory arrangement is configured such that memory cells arranged in various memory banks are accessed via only one of the at least two memory-bank access devices.

6. The memory arrangement according to claim 1, wherein the memory arrangement comprises an even number of memory banks and precisely two memory-bank access devices, wherein the memory arrangement is configured such that the memory cells pertaining to a first half of the memory banks are accessed via the first memory-bank access device, and the memory cells pertaining to a second half of the memory banks are accessed via the second memory-bank access device.

7. The memory arrangement according to claim 1, wherein the memory arrangement comprises precisely two temporary-storage devices, wherein:
    a first of the temporary-storage devices is arranged in an area extending from a center between a first of the memory-bank access devices and a second of the memory-bank access devices in a direction of the first memory-bank access device; and
    a second of the temporary-storage devices is arranged in an area extending from the center between the first memory-bank access device and the second memory-bank access device in a direction of the second memory-bank access device.

8. The memory arrangement according to claim 7, wherein the memory arrangement is configured such that the data to be transmitted between the interface and the memory cells of one of the memory banks that can be accessed via the first memory-bank access device are temporarily stored only in the first temporary-storage device, and the data to be transmitted between the interface and the memory cells of one of the memory banks that can be accessed via the second memory-bank access device are temporarily stored only in the second temporary-storage device.

9. The memory arrangement according to claim 1, wherein the memory arrangement comprises precisely four temporary-storage devices, wherein:
   a first of the temporary-storage devices is arranged in an area extending from a first of the memory-bank access devices in a direction that extends contrary to a direction from the first memory-bank access device to a second of the memory-bank access devices;
   a second of the temporary-storage devices is arranged in an area extending between a center between the first memory-bank access device and the second memory-bank access device and the first memory-bank access device;
   a third of the temporary-storage devices is arranged in an area extending between the center between the first memory-bank access device and the second memory-bank access device and the second memory-bank access device; and
   a fourth of the temporary-storage devices is arranged in an area extending from the second memory-bank access device in a direction that extends contrary to a direction from the second memory-bank access device to the first memory-bank access device.

10. The memory arrangement according to claim 9, wherein the memory arrangement is configured such that:
   the data to be transmitted between the interface and memory cells of a memory bank that is accessed via the first memory-bank access device are temporarily stored only in the first and second temporary-storage devices, the data comprising a first data portion and a remaining data portion, wherein first data portion is temporarily stored in the first temporary-storage device and the remaining data portion is temporarily stored in the second temporary-storage device; and
   the write data to be transmitted between the interface and memory cells of a memory bank that is accessed via the second memory-bank access device are temporarily stored only in the third and fourth temporary-storage devices, the data comprising a first data portion and a remaining data portion, wherein the first data portion is temporarily stored in the third temporary-storage device and the remaining data portion is temporarily stored in the fourth temporary-storage device.

11. The memory arrangement according to claim 1, wherein each of the at least two temporary-storage devices is arranged adjacent to one of the at least two memory-bank access devices.

12. The memory arrangement according to claim 1, wherein the interface, the at least two memory banks, the at least two memory-bank access devices, and the two temporary-storage devices are arranged on a common chip.

13. The memory arrangement according to claim 1, wherein the memory arrangement is a dynamic random access memory (DRAM) memory arrangement.

14. The memory arrangement according to claim 1, wherein:
   the interface is configured to receive and decode write data, addressing data, and command data;
   the at least two memory-bank access devices are configured to store write data in the at least two memory banks; and
   the at least two temporary-storage devices are configured to temporarily storing write data that are being transmitted from the interface to the at least two memory-bank access devices.

15. The memory arrangement according to claim 1, wherein:
   the interface is configured to transmit, code and/or decode read data, addressing data, and command data;
   the at least two memory-bank access devices are configured to read out read data from the at least two memory banks; and
   wherein the at least two temporary-storage devices are configured to temporarily store read data that are being transmitted from one of the at least two memory-bank access devices to the interface.

16. The memory arrangement according to claim 15, wherein the memory arrangement is a read only memory (ROM) memory arrangement.

17. A memory arrangement comprising:
   an interface configured to transmit, code and/or decoding data in the form of data packets in accordance with a predefined protocol;
   a first memory bank comprising at least one memory cell;
   a second memory bank comprising at least one memory cell;
   a first memory-bank access device configured to facilitate accessing data of the at least one memory cell of the first memory bank;
   a second memory-bank access device configured to facilitate accessing data of the at least one memory cell of the second memory bank;
   a first temporary-storage device connected to the interface and to the first memory-bank access device and configured to temporarily store data being transmitted between the interface and the first memory-bank access device, wherein the first temporary-storage device is arranged in an area extending from a center between the first memory-bank access devices and the second memory-bank access devices in the direction of the first memory-bank access device; and
   a second temporary-storage device connected to the interface and to the second memory-bank access device and configured to temporarily store data being transmitted between the interface and the second memory-bank access device, wherein the second temporary-storage device is arranged in an area extending from the center between the first memory-bank access device and the second memory-bank access device in the direction of the second memory-bank access device,
   wherein the data to be transmitted between the interface and the at least one memory cell of the first memory bank are temporarily stored only in the first temporary-storage device, and the data to be transmitted between the interface and the at least one memory cell of the second memory bank are temporarily stored only in the second temporary-storage device.

18. The memory arrangement according to claim 17, wherein the interface is configured to transmit serialized data packets, and the interface comprises:
   a device configured to parallelize and synchronize received data packets; and
   a device configured to serialize data packets to be sent.

19. The memory arrangement according to claim 17, wherein the interface is configured to transmit, code and/or decode write data, read data, addressing data, and command data.

20. The memory arrangement according to claim 17, wherein:
   the first temporary-storage device is arranged adjacent to the first memory-bank access device; and the second temporary-storage device is arranged adjacent to the second memory-bank access device.

21. A memory arrangement comprising:
an interface configured to transmit, code and/or decode data in the form of data packets in accordance with a predefined protocol;
a first memory bank comprising at least one memory cell;
a second memory bank comprising at least one memory cell;
a first memory-bank access device configured to facilitate accessing data of the at least one memory cell of the first memory bank;
a second memory-bank access device configured to facilitate accessing data of the at least one memory cell of the second memory bank;
a first temporary-storage device connected to the interface and to the first memory-bank access device, configured to temporarily store data being transmitted between the interface and the first memory-bank access device, and arranged in an area extending from the first memory-bank access device in a direction that extends contrary to a direction from the first memory-bank access device to the second memory-bank access device;
a second temporary-storage device connected to the interface and to the first memory-bank access device, configured to temporarily store data being transmitted between the interface and the first memory-bank access device, and arranged in an area extending between the first memory-bank access device and a center between the first memory-bank access device and the second memory-bank access device;
wherein data to be transmitted between the interface and memory cells of the first memory bank are temporarily stored only in the first and second temporary-storage devices, with a first data portion being temporarily stored in the first temporary-storage device and a remaining data portion being temporarily stored in the second temporary-storage device;
a third temporary-storage device connected to the interface and to the second memory-bank access device, configured to temporarily store data being transmitted between the interface and the second memory-bank access device, and arranged in an area extending between the second memory-bank access device and the center between the first memory-bank access device and the second memory-bank access device;
a fourth temporary-storage device connected to the interface and to the second memory-bank access device, configured to temporarily store data being transmitted between the interface and the fourth memory-bank access device, and arranged in an area extending from the second memory-bank access device in a direction that extends contrary to a direction from the second memory-bank access device to the first memory-bank access device; and
wherein data to be transmitted between the interface and memory cells of the second memory bank are temporarily stored only in the third and fourth temporary-storage devices, with a first data portion being temporarily stored in the third temporary-storage device and a remaining data portion being temporarily stored in the fourth temporary-storage device.

22. The memory arrangement according to claim 21, wherein the interface is configured to transmit serialized data packets, and the interface comprises:
a device configured to parallelize and synchronize received data packets; and
a device configured to serialize data packets to be sent.

23. The memory arrangement according to claim 21, wherein:
the first temporary-storage device is arranged adjacent to the first memory-bank access device;
the second temporary-storage device is arranged adjacent to the first memory-bank access device;
the third temporary-storage device is arranged adjacent to the second memory-bank access device; and
the fourth temporary-storage device is arranged adjacent to the second memory-bank access device.

24. A memory arrangement comprising:
means for transmitting, coding and/or decoding data in the form of data packets in accordance with a predefined protocol;
a first memory bank comprising at least one memory cell;
a second memory bank comprising at least one memory cell;
first means for facilitating accessing data of the at least one memory cell of the first memory bank;
second means for facilitating accessing data of the at least one memory cell of the second memory bank;
first means for temporarily storing data to be transmitted between the interface and the first means for facilitating accessing data, wherein the data to be transmitted between the interface and the at least one memory cell of the first memory bank are temporarily stored only in the first means for temporarily storing data; and
second means for temporarily storing data to be transmitted between the interface and the second means for facilitating accessing data, wherein the data to be transmitted between the interface and the at least one memory cell of the second memory bank are temporarily stored only in the second means for temporarily storing data.

25. A computer system comprising:
a data processing unit; and
a memory arrangement connected to the data processing unit, wherein the memory arrangement comprises:
an interface configured to transmit, code and/or decode data in the form of data packets in accordance with a predefined protocol, wherein the memory arrangement is connected to the data processing unit via the interface;
at least two memory banks, each memory bank including at least one memory cell;
at least two memory-bank access devices configured to facilitate accessing the data of the at least one memory cell of each of the at least two memory banks; and
at least two temporary storage devices configured to temporarily store data being transmitted between the interface and the at least two memory-bank access devices, wherein each of the at least two temporary storage devices is connected to the interface and to one of the at least two memory-bank access devices.

* * * * *